United States Patent

[11] 3,555,993

| [72] | Inventor | Vidal Garcia |
| | | 835 E. 4th St., Brownsville, Tex. 78520 |
| [21] | Appl. No. | 726,893 |
| [22] | Filed | May 6, 1968 |
| [45] | Patented | Jan. 19, 1971 |

[54] TORTILLA FRYING APPARATUS
7 Claims, 6 Drawing Figs.

[52] U.S. Cl. ................................................. 99/426,
99/416, 99/450, 99/448
[51] Int. Cl. .................................................... A23p 1/00,
A47j 37/12
[50] Field of Search .......................................... 99/416,
417, 418, 426, 427, 448, 449, 450;
249/(Inquired); 18/(Inquired); 211/177

[56] References Cited
UNITED STATES PATENTS

| 519,580 | 5/1894 | Kelsey .......................... | 99/448 |
| 520,846 | 6/1894 | Foland .......................... | 99/448 |
| 1,266,912 | 5/1918 | Bradbury ....................... | 99/450OUX |
| 2,570,374 | 10/1951 | Pompa .......................... | 99/416 |
| 2,652,768 | 9/1953 | Moreno ......................... | 99/417 |
| 2,664,812 | 1/1954 | Molina .......................... | 99/448X |

*Primary Examiner*—Billy J. Wilhite
*Attorneys*—Arnold, White and Durkee, Tom Arnold, Donald C. Roylance, Walter Kruger, Bill Durkee and Frank S. Vaden, III

ABSTRACT: In one exemplary embodiment, an apparatus for frying tortillas to form crisp shells for tacos, tostadas and the like is provided, having a base member and a space-apart pair of upright members fixed thereto with a rod transversely attached to the outer ends of the upright members for providing a means of handling the apparatus. A plurality of inverted V-shaped forming members and tortillas are alternately placed to form an upright stack resting on the base member and disposed between the upright members for engagement therewith. Sliding bolt latches disposed adjacent the ends of the topmost forming member engage apertures in the upright members to lock the stack of forming members and interspersed tortillas in place between the upright members during the frying process.

PATENTED JAN 19 1971

3,555,993

VIDAL GARCIA
INVENTOR.

BY Arnold, Roylance,
Kruger & Durkee
ATTORNEYS

TORTILLA FRYING APPARATUS

BACKGROUND OF THE INVENTION

Tacos and tostadas are food delicacies served extensively in the Southwestern portion of the United States, composed of a crisply fried tortilla shell on top of which various foods, such as refried beans, cheese, grated vegetables, chili, etc., are placed and seasoned as desired.

It is commonly known to the art that tortillas are thin, flat discs of corn or grain flour dough. In their uncooked or semicooked form they are soft and flexible and can be easily rolled or bent. To form the edible shells for tacos, tostadas and other forms of similar dishes, the soft, flexible tortillas must be fried to a crisp rigid shell. The preparation of tacos shells generally involves the frying of soft tortillas by hand in a deep fat fryer while the tortillas is held in a diametrically folded position, either V-shaped or U-shaped and placed in the fryer until the tortillas are crisp. The tacos shell is then removed, the oil drained and a suitable filling is supplied. The frying operation has been somewhat difficult and tedious in that it requires manual holding of the tortilla in the desired shape during the frying process, or in the use of rather makeshift pans to hold the tortillas in proper shape. When preparing tostadas, the tortillas are generally fried to a crisp flat condition by floating the soft flexible tortilla on the surface of the heated oil or grease and manually tending it while it is fried to attain a crisp flat configuration. It is then removed and topped with the various foods as hereinbefore mentioned. The difficult or limiting factor is the fragile nature of the tortilla when it is fried crisp and because of this, ordinary methods of preparation result in much breakage and wasting of tortillas when preparing either the tacos or tostadas shells.

When frying soft flexible tortillas by hand, it is practically impossible to provide smooth flat surfaces on the crisply fried tortilla to be used with tostadas or provide uniformly shaped crisply fried tacos shells. It is highly desirable that the crisply fried tortilla which forms the shells be as smooth and uniformly shaped as possible.

The present invention remedies the problems of the prior art by providing an inexpensive, lightweight portable tortilla frying device that may be used with conventional deep fat fryers for preparing crisply fried shells for tacos, tostadas, and like foods.

SUMMARY OF THE INVENTION

The instant invention provides a novel tortilla frying device for use with a deep fat fryer having a rigid base, upright extending members attached to the sides of the base and means engageable with the upright members for forming the tortillas in a desired configuration during the deep fat frying process. The rigid base member is constructed of a metal sheet and has a plurality of apertures disposed therein for allowing circulation of the hot grease in the deep fat fryer. The upright members are a pair of upwardly extending metal arms disposed in a spaced-apart relationship and rigidly attached adjacent opposite ends of the base member. A rod is attached transversely between the extending ends of the upright members for providing a convenient handle for the device.

Disposed in a stacked relationship, one upon the other, are a plurality of elongated forming members having inverted V-shaped cross sections. The soft flexible baked tortillas are disposed between adjacent forming members where the weight of the upper forming member rests upon the tortilla and the lower forming member to cause the tortilla to assume the cross-sectional shape of the forming members during the process. Each forming member has an outwardly opening slot disposed centrally in its opposite longitudinal ends for engaging the upright members and maintaining the forming members in their stacked relationship. One forming member has a sliding bolt latch fixed adjacent the slot disposed in each longitudinal end and is adapted for outward extension of the bolt along the center line of the slots to engage locking apertures disposed longitudinally in the upright members. Forming members having various cross-sectional configurations may be utilized to form the soft flexible tortillas to a desired shape for making crisp fried tacos shells, or flat or saucer-shaped shells for tostadas.

Accordingly, one feature of the present invention is to provide a deep fat frying device for rapidly frying tortillas so that they have a desired uniform shape.

Another feature of the present invention is to provide a device for frying tortillas in a deep fat fryer into which the soft tortillas may be easily placed, and from which the fried tortilla shells may be easily removed.

Another feature of the present invention is to provide a tortilla frying device that can conveniently handle one or more tortillas for frying in a deep fat fryer so that the tortillas are fried having a uniform shape without the need for constant holding or attention on the part of the cook.

Yet another feature of the present invention is to provide a tortilla frying device for use with a deep fat fryer that minimizes the danger of loss or breakage of the fragile crisply fried tortillas.

Still another feature of the present invention is to provide a tortilla frying device which is simple and inexpensive to manufacture and which may be conveniently handled and disassembled for easy maintenance and cleaning.

Another feature of the present invention is to provide a tortilla frying device in which the soft flexible tortillas are held in the form desired between two forming members, so that when they are immersed in the deep fat fryer they will not be dislodged and float to the surface or lose their shape.

Yet, another feature of the present invention is to provide a device for the deep fat frying of soft flexible tortillas so that they may easily be immersed into the deep fat fryer and removed in a manner to allow the hot grease or oil from the tortillas to drain back into the fryer.

BRIEF DESCRIPTION OF THE DRAWINGS

In order that the manner in which the above-recited advantages and features of the invention are attained as well as others which will become apparent, can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

In the drawings.

DETAILED DESCRIPTION OF THE PREFERRED EMBODIMENTS

Figure 1:
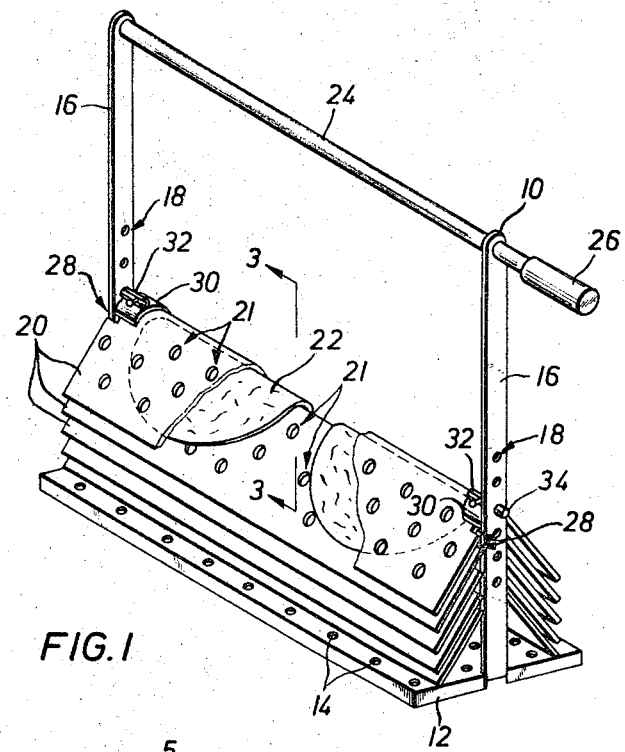
FIG. 1 is a perspective view of the tortilla frying device according to the present invention.

Referring now to FIG. 1, a perspective view of the tortilla frying device 10 according to the present invention is shown. The frying device 10 is comprised of a metal rectangular base member 12, two narrow upright members 16, a rod 24 attached adjacent the extending ends of the uprights 16 with an insulated section 26 for handling the device, and a plurality of tortilla forming members 20 adapted for insertion between the upright members 16. Flexible baked tortillas 22 are inserted between adjacent forming members 20 for forming the tortillas 22 in the desired shape during the frying process. Base member 12 is preferably constructed of a lightweight sheet metal material and has a plurality of apertures disposed in the flat upper surface thereof for allowing the hot fat of the fryer to circulate freely through the base member and thus prevent the "lifting" of the frying device 10 as the hot fat boils upwardly in the deep fat fryer. Upright members 16 are centrally attached to opposite longitudinal ends of base member 12. Locking apertures 18 are disposed at spaced intervals in the central portion of upright member 16 and along its longitudinal axis to provide locking apertures for purposes to be hereinafter described.

The forming members 20 are constructed of rectangular sheet metal plates, perforated as at 21, and bent along their longitudinal axis to exhibit a shallow V-shaped cross section. The V-shape of the forming members 20 provides the capability of being "nested" or stacked one upon the other between upright members 16. The flexible baked tortillas 22 are disposed between each of the adjacent forming members 20 in the stack to form and hold the tortillas in the desired shape during the frying process. Forming members 20 in the stack to form and hold the tortillas in the desired shape during the frying process. Forming members 20 have an outwardly opening slot 28 disposed in each longitudinal end adjacent the apex of the V-shaped cross section. Slot 28 engages the upright members 16 to act as a guide for allowing forming members 20 to move vertically but prevent lateral or sideward movement of the forming members.

Attached to one of the forming members 20 is a bracket 30, carrying a sliding bolt latch 32, disposed centrally adjacent slots 28 so that the longitudinal axis of the bolt latch 32 coincides with the longitudinal axis of the forming member 20 and the center of slot 28. Forming members 20 and tortillas 22 are alternately stacked, as shown in FIG. 1, until the desired number of tortillas 22 to be fried have been placed between stacked forming members 20. The top forming member of the stack has the attached sliding bolt latches 32 for allowing bolts 34 to be inserted into corresponding locking apertures 18 disposed in each of the upright members 16. In this way, the stack of forming members 20 is snugly held in place and tortillas 22 are formed and retained in the desired shape during the frying process.

If the topmost forming member 20 was not locked into place by the action of bolts 34 engaging locking apertures 18, the boiling action of the hot fat in the fryer would "lift" the forming members 20 causing them to oscillate and possibly disengage from the upright members 16. If the forming members 20 separate, tortillas 22 will not be maintained in the desired shape during the frying process.

Figure 2:
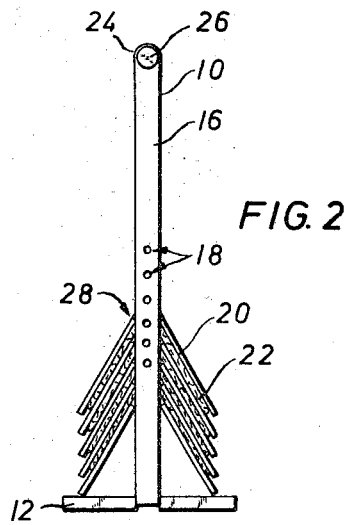
FIG. 2 is an end elevational view of the tortilla frying device as shown in FIG. 1.

In FIG. 2, an end elevational view of the tortilla frying device 10, as shown in FIG. 1, is illustrated. Base 12, with attached supporting uprights 16, and rod 24 with handle 26 is shown. Uprights 16 have a vertical series of spaced locking apertures as hereinbefore described. The V-shaped tortilla forming members 20, having slots 28 engaging the outer surfaces of the uprights 16, are shown in a stacked or "nested" position with flexible baked tortillas 22 disposed between adjacent stacked forming members 20. The lower one of the stacked forming members 20 is shown resting on the top surface of base 12 for supporting the stack of forming members 20 and interspersed tortillas 22.

Figure 3:
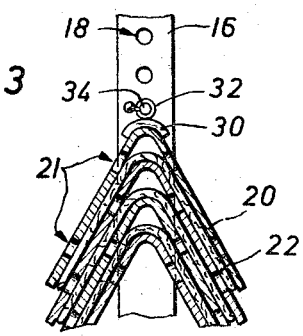
FIG. 3 is a partial detailed vertical cross-sectional view of the tortilla frying device according to this invention taken along lines 3–3 of FIG. 1.

Referring now to FIG. 3, a partial vertical detailed cross-sectional view of the tortilla frying device 10 is shown as taken along lines 3-3 of FIG. 1. V-shaped forming members 20 are shown in their stacked relationship one upon the other, with flexible baked tortillas disposed between adjacent ones of the forming members 20 as hereinabove described. The bracket 30 is suitably attached to the outer apex rim of the topmost V-shaped forming member 20. Bracket 30 has attached thereto a conventional sliding-bolt latch 32, adapted for allowing bolts 34 to slide outwardly over the center line of slots 28 disposed in the ends of the forming member 20 and longitudinally adjacent the outer edges of brackets 30. In this way, with forming members 20 engaging upright members 16 by means of slots 28 to retain the forming members 20 in their stacked relationship for shaping and retaining tortillas 22, sliding-bolt 34 is engageable in one of the aligned locking apertures 18 to lock the topmost forming member 20 in a position for preventing lateral or vertical movement of the stacked members 20.

Tortilla toasting device 10 may conveniently be constructed of a lightweight sheet metal material such as aluminum, aluminum alloys, or any other suitable metal material such as stainless steel or the like, which will withstand the heat during the deep frying process. As previously mentioned, handle 26 may be made of any convenient insulating material to provide a convenient means for handling the tortilla toasting device 10 during the frying process. Of course, forming members 20 are not limited to a V-shaped configuration as shown in FIGS. 1-3, but may be of any desired cross-sectional configuration for forming the tortillas 22 during frying as long as the members 20 may be stacked or "nested" together to mold and shape tortillas 22. Some convenient shapes may be the V-shape as shown, or a U or W-shaped cross-sectional configuration (not shown). The sliding-bolt latch 32 was found to be convenient and simple to use as a means for locking the top forming member 20 in place and preventing vertical and lateral movement of the stacked members 20 during the frying process. However, any other suitable latching means may be employed.

Figure 4:
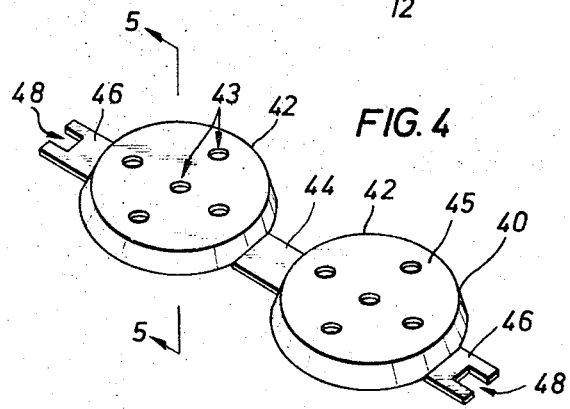
FIG. 4 is a perspective view of another embodiment of a tortilla forming member that may be utilized with the invention shown in FIG. 1.

Referring now to FIG. 4, a perspective view of another embodiment of a tortilla forming member that may be utilized in the present invention is shown. Tortilla forming member 40 has two circular pan-shaped forming sections disposed in a side-by-side relationship and interconnected by a bracket 44. An extension 46 protrudes from the rim of each forming section on the side opposite the side attached to the interconnecting bracket 44. The extensions 46 and bracket 44 lie in a line which passes through the center of each of the circular forming sections 42.

Each extension 46 has an outwardly facing slot 48 disposed therein for engaging the narrow upright members 16 of tortilla frying device 10 in the same manner as the V-shaped forming members 20. Of course, as was hereinbefore described when the forming members 20 were utilized, a top member 40 would have a sliding bolt latch (not shown) similar to latch 32 attached as seen in FIGS. 1 and 3, for providing a locking means for locking the topmost forming member 40 to upright members 16 and retaining members 40 in their stacked relationship with tortillas disposed between adjacent ones of the forming members 40 as hereinbefore described.

Figure 5:
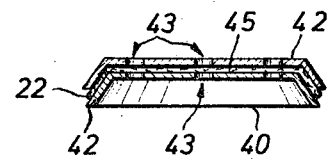
FIG. 5 is a detailed vertical cross-sectional view of the tortilla forming members taken along lines 5–5 of FIG. 4.

FIG. 5 is a vertical cross-sectional view of forming sections 42 as taken along lines 5-5 of FIG. 4 and shows the inverted panlike cross-sectional configuration of sections 42. A flexible baked tortilla 22 is shown draped over the upturned base of the forming section 42 so that when another forming section 42 is stacked upon tortilla 22 and the forming section 42 below, tortilla 22 will be molded into a saucer-shaped configuration by the action of the two complementary forming sections 42. If the tortillas 22 were of such a size as to only fit over the flat surface 45 of inverted forming members 42, flat tortilla shells may be made instead of the dished shells just described. Of course, a forming member having a flat surface and adapted to engage uprights 16 of device 10 could be employed to make flat crisply fried tortilla shells.

Figure 6:
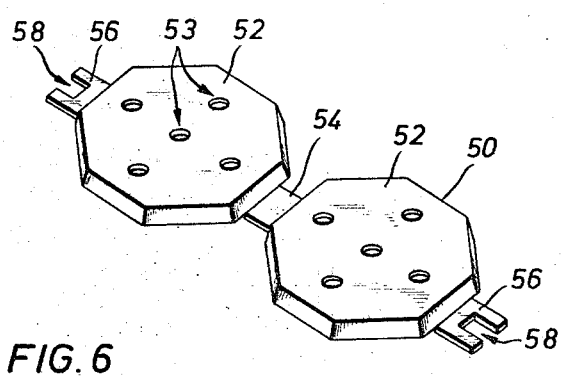
FIG. 6 is a perspective view of yet another embodiment of the tortilla forming member that may be utilized with the invention shown in FIG. 1.

Referring now to FIG. 6, a perspective view of a third embodiment of a tortilla forming member is shown and may be utilized with the present invention illustrated in FIG. 1. Tortilla forming member 50 has two octagon-shaped forming sections 52 having an inverted dished or pan-shaped configuration similar to forming member 40 as shown in FIGS. 4 and 5. Forming sections 50 are shown disposed in a side-by-side relationship and rigidly interconnected by bracket 44. Extensions 56 are attached to the outer rims of forming sections 50 and protrude outwardly from each section 52 from the side opposite the side interconnected by bracket 54. Extensions 56 have outwardly opening slots 58 disposed therein to provide means for engaging guiding forming members 50 along uprights 16 in a manner as hereinbefore described for forming members 20 and 40.

It may be seen, that through the use of forming members 40 and 50, the flexible baked tortillas may be given a dished or pan shape for frying tortillas when preparing tostadas and other dishes. Of course, the present invention is not limited to the use of circular or octagon-shaped forming sections 42 or 52, as any other suitable configuration that will provide a tortilla shell of a desired configuration may be utilized.

Numerous variations and modifications may obviously be made in the structure herein described without departing from the present invention. Accordingly, it should be clearly understood that the forms of the invention herein described and shown in the FIGS. of the accompanying drawings are illustrative only and are not intended to limit the scope of the invention.

I claim:

1. A tortilla frying device, comprising:
   a base member;
   a pair of upright members disposed in a spaced-apart relationship and attached to said base member, said upright members having a transverse rod interconnecting the upwardly extending free ends to form a handle for the device, said upright members further having spaced apertures longitudinally disposed therein;
   a plurality of stackable forming members for shaping flexible baked tortillas, said forming members disposed between said upright members in a stacked relationship with the tortillas disposed therebetween, said forming members having slotted openings in each end for engaging said upright members and preventing lateral movement of said stacked forming members; and
   a pair of sliding bolt latches, one disposed adjacent each of said ends of one of said forming members for engaging said spaced apertures in said upright members and preventing vertical movement of said stacked forming members.

2. The tortilla frying device as described in claim 1, wherein said forming members comprise rectangular metal sheets bent along their longitudinal axis to form elongated members having an inverted V-shaped cross section.

3. The tortilla frying device as described in claim 1, wherein said forming members comprise a plurality of inverted dished metal sections disposed in a side-by-side relationship and transversely interconnected to form an elongate member.

4. A tortilla frying device, comprising:
   a rectangular base member;
   a pair of narrow upright members disposed in a spaced-apart relationship and rigidly attached adjacent opposite longitudinal ends of said base member, said upright members having a plurality of spaced apertures longitudinally disposed therein;
   a rod attached to the extending ends of said upright members for providing a handle for the device;
   a plurality of stackable forming members for shaping flexible baked tortillas, said forming members disposed between said upright members in a stacked relationship with the tortillas disposed therebetween, said forming members having an outwardly opening slot disposed adjacent opposite ends of said member for engaging said upright members and preventing lateral movement of said stacked forming members; and
   a pair of sliding bolt latches one of which is fixed adjacent each end of the topmost forming member of said stack of forming members and adapted for the lateral extension of the bolts relative to said forming member to engage said apertures in said upright members for retaining said forming members in said stacked position.

5. The tortilla frying device as described in claim 4, wherein said base member comprises a perforated plate of a sheet metal material.

6. The tortilla frying device as described in claim 4, wherein said forming members are elongated perforated metal sheets having an inverted V-shaped cross section.

7. The tortilla frying device as described in claim 4, wherein said forming members comprise a plurality of perforated inverted panlike metal sections disposed in a side-by-side planar relationship and transversely interconnected, said members having outwardly extending tabs, with said slots disposed therein for engaging said upright members.